(12) United States Patent
Kascak et al.

(10) Patent No.: US 7,456,537 B1
(45) Date of Patent: Nov. 25, 2008

(54) CONTROL SYSTEM FOR BEARINGLESS MOTOR-GENERATOR

(75) Inventors: Peter E. Kascak, Eaton Township, OH (US); Ralph H. Jansen, Eaton Township, OH (US); Timothy P. Dever, Westlake, OH (US)

(73) Assignee: The University of Toledo, Toledo, OH (US)

( * ) Notice: Subject to any disclaimer, the term of this patent is extended or adjusted under 35 U.S.C. 154(b) by 262 days.

(21) Appl. No.: 11/304,359

(22) Filed: Dec. 15, 2005

Related U.S. Application Data

(60) Provisional application No. 60/637,280, filed on Dec. 17, 2004.

(51) Int. Cl.
*H02K 7/09* (2006.01)
*H02P 5/00* (2006.01)
*H02P 21/00* (2006.01)

(52) U.S. Cl. .................. 310/90.5; 318/495; 310/113
(58) Field of Classification Search .......... 310/90.5
See application file for complete search history.

(56) References Cited

U.S. PATENT DOCUMENTS

| | | | |
|---|---|---|---|
| 3,888,553 A | 6/1975 | Wehde | |
| 4,077,678 A | 3/1978 | Studer et al. | |
| 4,285,552 A | 8/1981 | Sutter | |
| 4,340,260 A | 7/1982 | Forster et al. | |
| 4,500,142 A | 2/1985 | Brunet | |
| 5,237,229 A | 8/1993 | Ohishi et al. | |
| 5,406,157 A | 4/1995 | New | |
| 5,424,595 A | 6/1995 | Preston et al. | |
| 5,682,071 A | 10/1997 | Buhler et al. | |
| 5,703,423 A * | 12/1997 | Fukao et al. | 310/90.5 |
| 5,708,346 A * | 1/1998 | Schob | 318/803 |
| 5,760,508 A | 6/1998 | Jennings et al. | |
| 5,818,137 A | 10/1998 | Nichols et al. | |
| 5,936,370 A * | 8/1999 | Fukao et al. | 318/652 |
| 5,949,162 A * | 9/1999 | Mishkevich et al. | 310/51 |
| 5,955,811 A | 9/1999 | Chiba et al. | |
| 5,995,811 A | 11/1999 | Watanabe | |
| 6,053,705 A | 4/2000 | Schob et al. | |

(Continued)

OTHER PUBLICATIONS

Ueno et al. ("Characteristics of Axial Force and Rotating Torque and Their Control of Permanent Magnet Type Axial Gap Self-bearing Motor", Electrical Engineering in Japan, vol. 132, No. 1, pp. 81-90, 2000.*

(Continued)

*Primary Examiner*—Burton Mullins
(74) *Attorney, Agent, or Firm*—MacMillan, Sobanski & Todd, LLC

(57) ABSTRACT

A control system for an electromagnetic rotary drive for bearingless motor-generators comprises a winding configuration comprising a plurality of individual pole pairs through which phase current flows, each phase current producing both a lateral force and a torque. A motor-generator comprises a stator, a rotor supported for movement relative to the stator, and a control system. The motor-generator comprises a winding configuration supported by the stator. The winding configuration comprises at least three pole pairs through which phase current flows resulting in three three-phase systems. Each phase system has a first rotor reference frame axis current that produces a levitating force with no average torque and a second rotor reference frame axis current that produces torque.

4 Claims, 20 Drawing Sheets

U.S. PATENT DOCUMENTS

| | | | |
|---|---|---|---|
| 6,078,119 A * | 6/2000 | Satoh et al. | 310/90.5 |
| 6,130,494 A | 10/2000 | Schob | |
| 6,166,469 A * | 12/2000 | Osama et al. | 310/90.5 |
| 6,351,048 B1 * | 2/2002 | Schob et al. | 310/90.5 |
| 6,359,356 B1 * | 3/2002 | Hayashi | 310/90.5 |
| 6,359,357 B1 | 3/2002 | Blumenstock | |
| 6,559,567 B2 | 5/2003 | Schob | |
| 6,710,495 B2 * | 3/2004 | Lipo et al. | 310/184 |
| 6,849,979 B2 | 2/2005 | Brunet et al. | |
| 7,078,839 B2 * | 7/2006 | Kim | 310/90.5 |
| 2007/0216244 A1 * | 9/2007 | Edelson | 310/90.5 |

OTHER PUBLICATIONS

Advances in Flywheel Energy Storage Systems, Power Pulse, Darnell Group Inc., darnell.com (2001).

Mohamed et al., "*Conical Magnetic Bearings with Thrust Control,*" IEEE Transactions on Automatic Control, vol. 37, No. 12, Dec. 1992.

* cited by examiner

CONTROL SYSTEM FOR BEARINGLESS MOTOR-GENERATOR

CROSS REFERENCE TO RELATED APPLICATIONS

This application is a continuation of U.S. Provisional Patent Application Ser. Nos. 60/637,280, which was filed on Dec. 17, 2004, and the description of which is incorporated herein by reference.

This invention was made with government support under NCC3-916 and NCC3-924 awarded by NASA. The government has certain rights in the invention.

BACKGROUND OF INVENTION

The present invention generally relates to an electromagnetic rotary drive and more particularly, to an electromagnetic rotary drive that functions as a bearingless motor-generator. Most particularly, the invention relates to a control system for a bearingless motor-generator.

Electromagnetic rotary drives are commonly used in standard motors as well as bearingless motor-generators. A conventional electromagnetic rotary drive includes a rotating part and a stationary part. The rotary part is commonly referred to as a rotor and the stationary part is commonly referred to as a stator. The stationary part supports a set of windings. A conventional control system for an electromagnetic rotary drive for a standard motor is shown in FIG. 1. The control system, generally indicated at 10, includes six switches 12, which control the flow of phase currents into a set of windings to produce forces, which exert a torque on a rotating part. However, this control system produces no forces for levitating the rotating part, since poles carry the same flux, and balance their forces out.

Unlike the standard motor described above, a conventional bearingless motor-generator produces forces for levitating the rotating part. An example of a bearingless motor-generator is described in U.S. Pat. No. 6,559,567, issued May 6, 2003, to Schöb, the description of which is incorporated herein by reference. This bearingless motor-generator has a control system for an electromagnetic rotary drive that includes control devices, which control the flow of phase currents into two windings. The phase currents have a mutual phase shift of about 120°. The control system produces forces transverse to the windings. These transverse forces can be repulsive forces or attractive forces. By orienting the windings as described by Schöb, the forces may be directed at an angle greater than 0° and less than 90° relative to the axis of rotation of the rotor. In this way, the rotor can be axially or radially levitated.

It should be noted that the bearingless motor-generator described above includes a drive winding for producing a drive field and a separate control winding for producing a control field. The drive field exerts a torque on the rotating part to rotate the rotating part and the control field exerts a force on the rotating part to levitate the rotating part.

A control system is needed that permits both drive and control fields to be produced from the same set of windings, thus eliminating the need to separate drive and control windings.

SUMMARY OF INVENTION

The present invention is directed toward a control system for an electromagnetic rotary drive for bearingless motor-generators that meets the foregoing needs. The control system comprises a winding configuration comprising a plurality of individual pole pairs through which phase currents flow, each phase current producing both a lateral force and a torque.

The present invention is also directed toward a bearingless motor-generator. The motor-generator comprises a stator, a rotor supported for movement relative to the stator, and a control system. The motor-generator comprises a winding configuration supported by the stator. The winding configuration comprises at least three pole pairs through which phase currents flow resulting in three three-phase systems. Each phase system has a first rotor reference frame axis current that produces a levitating force with no average torque and a second rotor reference frame axis current that produces torque.

Various objects and advantages of this invention will become apparent to those skilled in the art from the following detailed description of the preferred embodiment, when read in light of the accompanying drawings.

DETAILED DESCRIPTION

Figure 1:
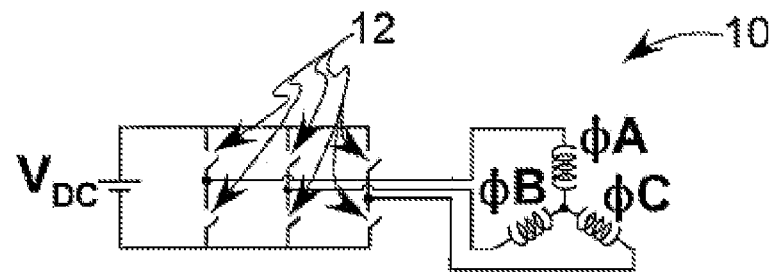
FIG. 1 is schematic representation of a motor drive system according to the prior art.
Figure 2:
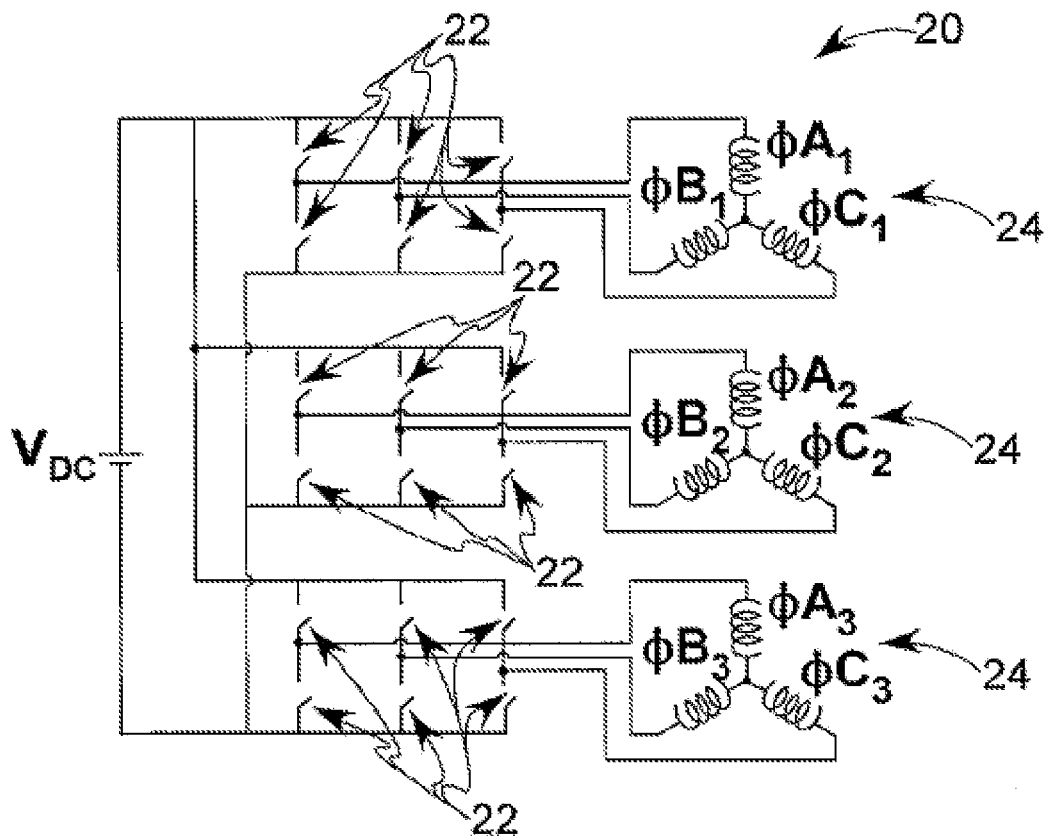
FIG. 2 is schematic representation of a cylindrical motor drive control system according to one embodiment of the invention.

Referring now to the drawings, there is illustrated in FIG. 2 a cylindrical motor control system 20 for an electromagnetic rotary drive for use in a cylindrical bearingless motor-generator (hereinafter "motor"). It should be noted that the standard motor drive control system described above has only six switches 12, while the control system 20 shown in FIG. 2 has eighteen switches 22. As a consequence, the control system 20 can stimulate three systems of three phases. Each of these systems comprises a pole pair system, generally indicated at 24, resulting in three pole pair systems. Although there are three times as many switches, the required power rating for each switch 22 is much smaller than that for the conventional control system 10 described above. For example, if the number of turns in the motor is kept constant, the voltage the switches 22 would be required to block would be one third of the normal system voltage of the conventional control system 10. If the motor is required to have the same bus voltage as the conventional control system 10, the number of winding turns could be increased and the switches 22 would only carry one third the normal current of the conventional control system 10. In addition, the new control system 20 provides fault tolerance. If any of the coils in the new control system 20 or the power electronics for a pole pair system 24 fails, the other two three-phase systems will still be able to provide motor torque and magnetic bearing forces.

Figure 3:
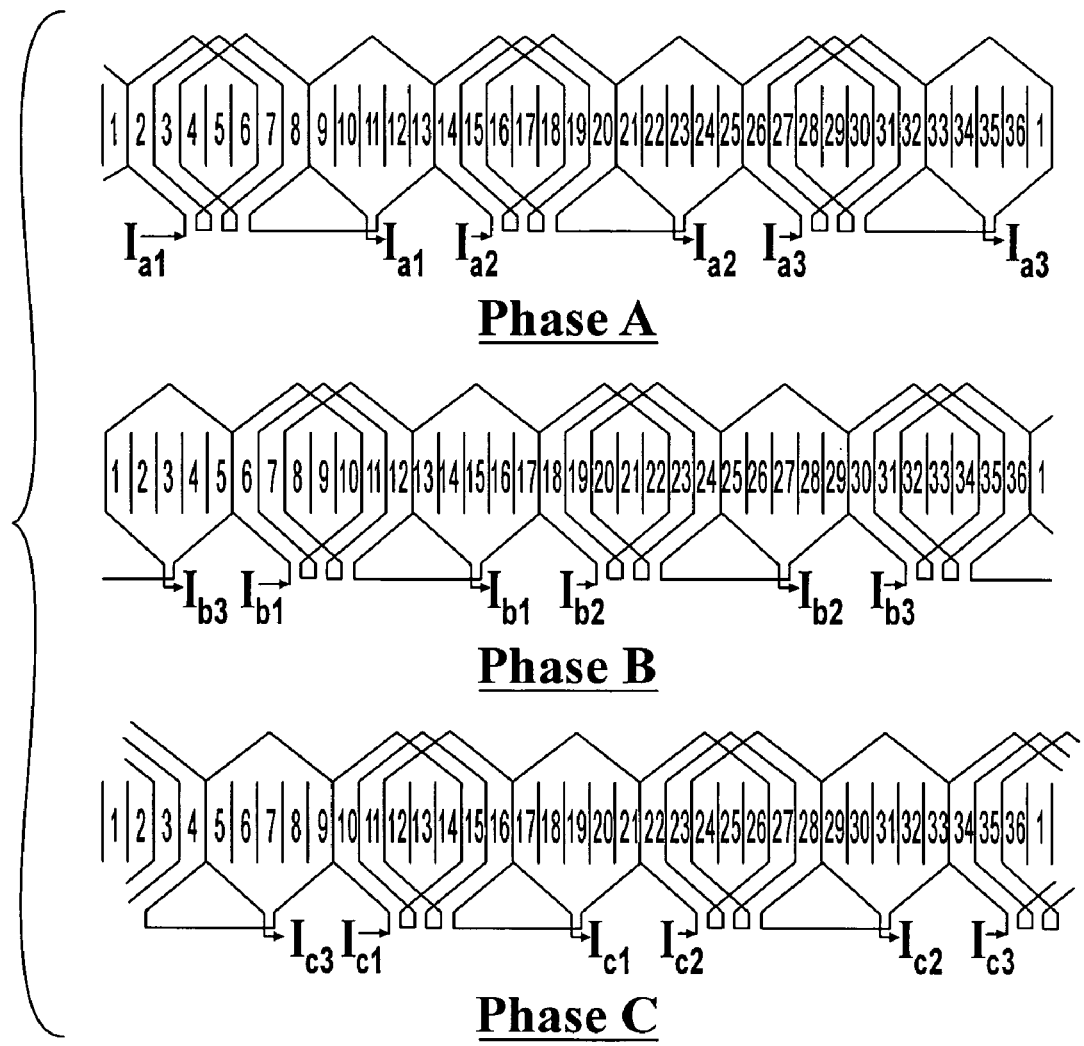
FIG. 3 is a diagrammatic representation of a winding with individually stimulated pole pairs.

A winding configuration with individually stimulated pole pairs is shown in FIG. 3. In this winding configuration, phase currents $i_{a1}$, $i_{a2}$, $i_{a3}$, $i_{b1}$, $i_{b2}$, $i_{b3}$, $i_{c1}$, $i_{c2}$, $i_{c3}$ are defined in the three pole pairs 24 shown in FIG. 2. These are essentially three three-phase systems. The first system contains phase currents $i_{a1}$, $i_{b1}$, and $i_{c1}$. This system can be transformed into a rotor reference frame with known transformations, as follows:

$$\begin{bmatrix} i_{qs1}^r \\ i_{ds1}^r \\ i_{01} \end{bmatrix} = \begin{bmatrix} \cos\theta_r & \cos\left(\theta_r - \frac{2\pi}{3}\right) & \cos\left(\theta_r + \frac{2\pi}{3}\right) \\ \sin\theta_r & \sin\left(\theta_r - \frac{2\pi}{3}\right) & \sin\left(\theta_r + \frac{2\pi}{3}\right) \\ \frac{1}{2} & \frac{1}{2} & \frac{1}{2} \end{bmatrix} \begin{bmatrix} i_{a1} \\ i_{b1} \\ i_{c1} \end{bmatrix} \quad (1)$$

Figure 4:
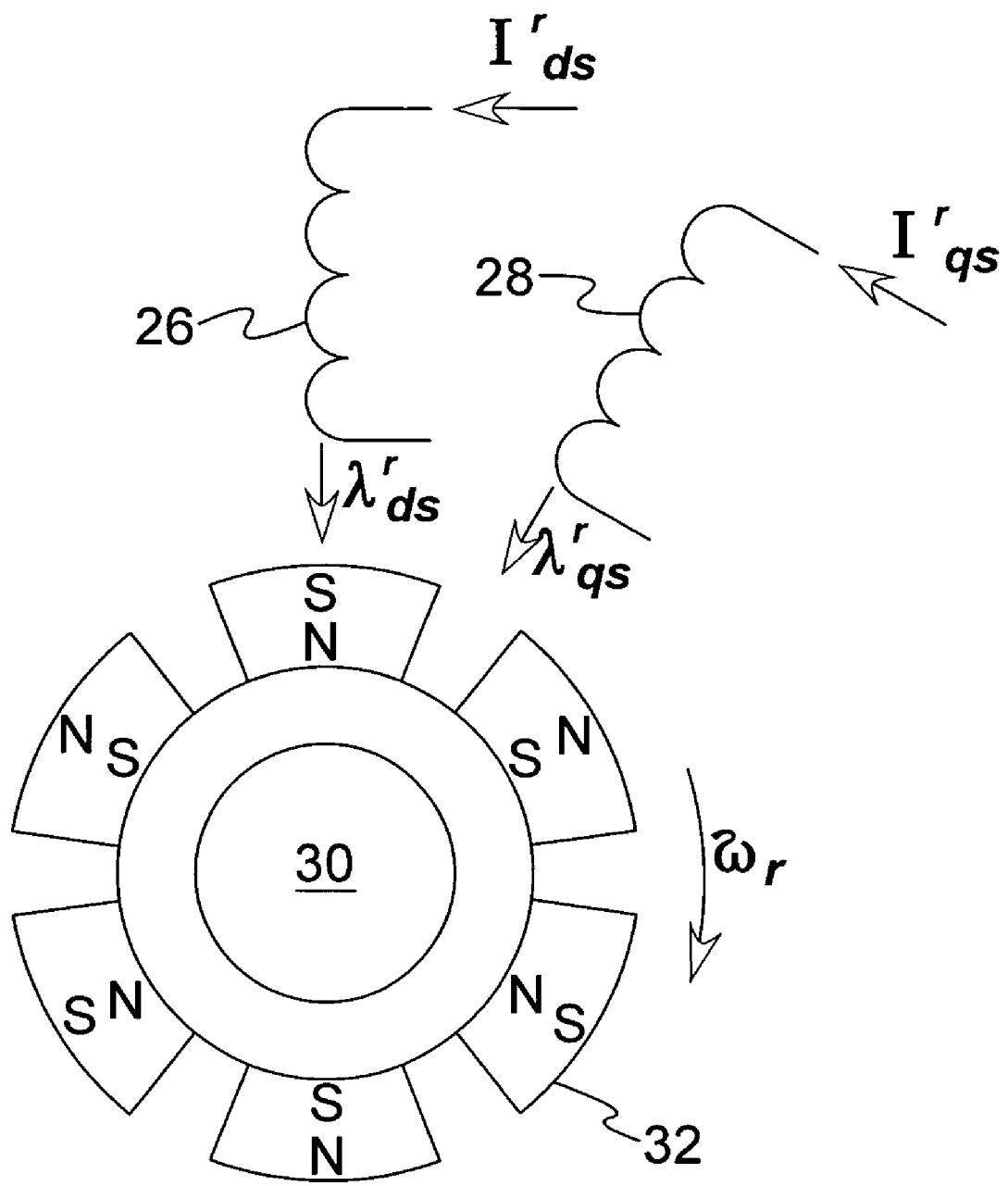
FIG. 4 is a schematic representation of stator induced flux in a rotor reference frame.

FIG. 4 shows fictional coils (illustrating the manner in which the three three-phase systems operate), generally indicated at 26, 28, which rotate with the rotor 30 representing the rotor reference frame q and d-axis currents. It should be noted that the rotor reference frame d-axis current produces no average torque and the rotor reference frame q-axis current produces torque.

Figure 5:
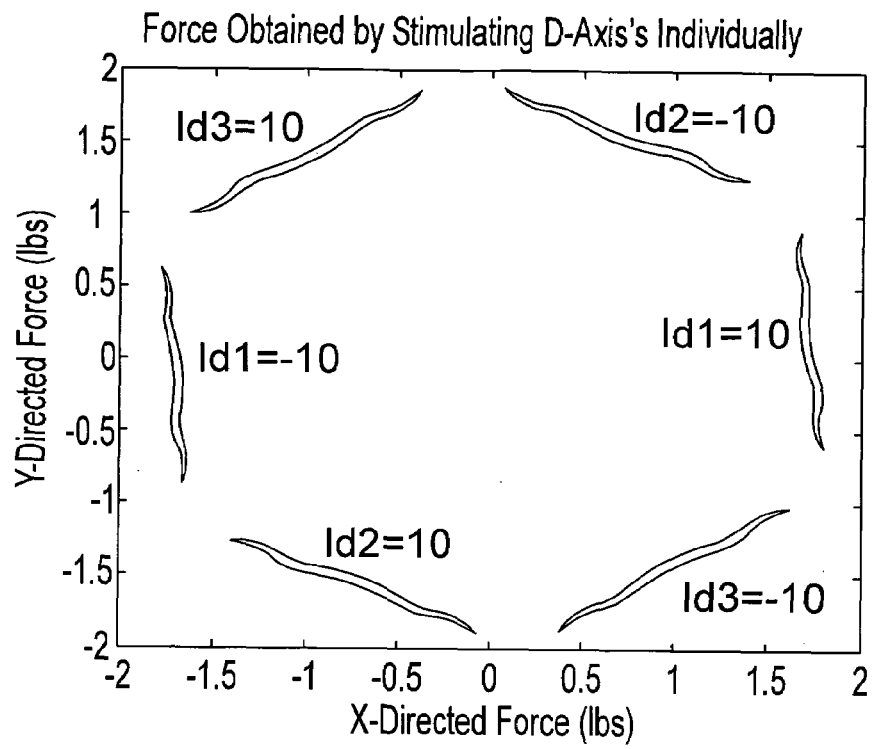
FIG. 5 is a graphic representation of force induced from pole pair d-axis current.
Figure 6:
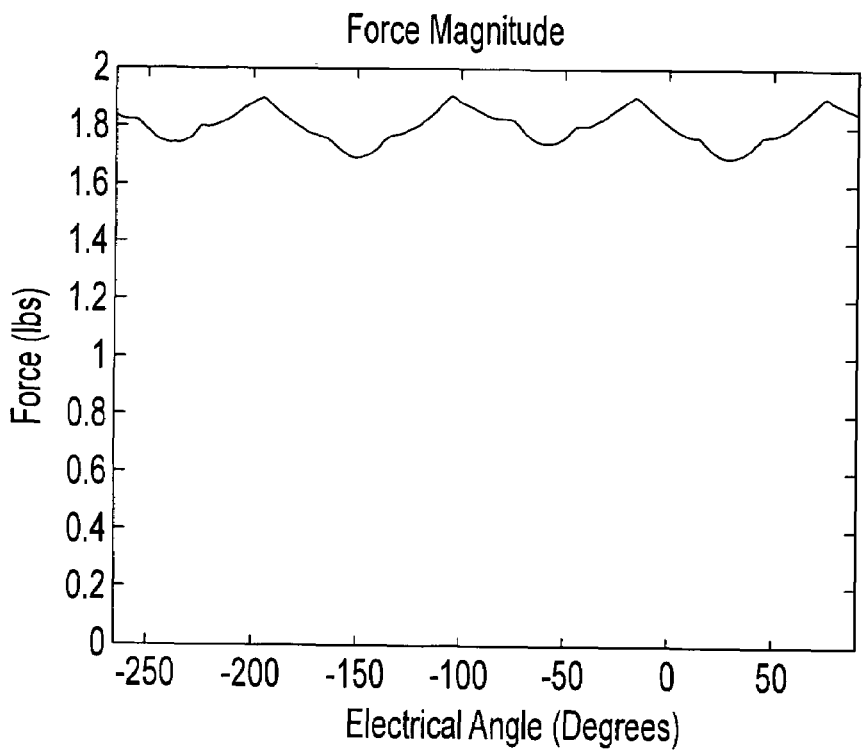
FIG. 6 is a graphic representation of a force magnitude.
Figure 7:
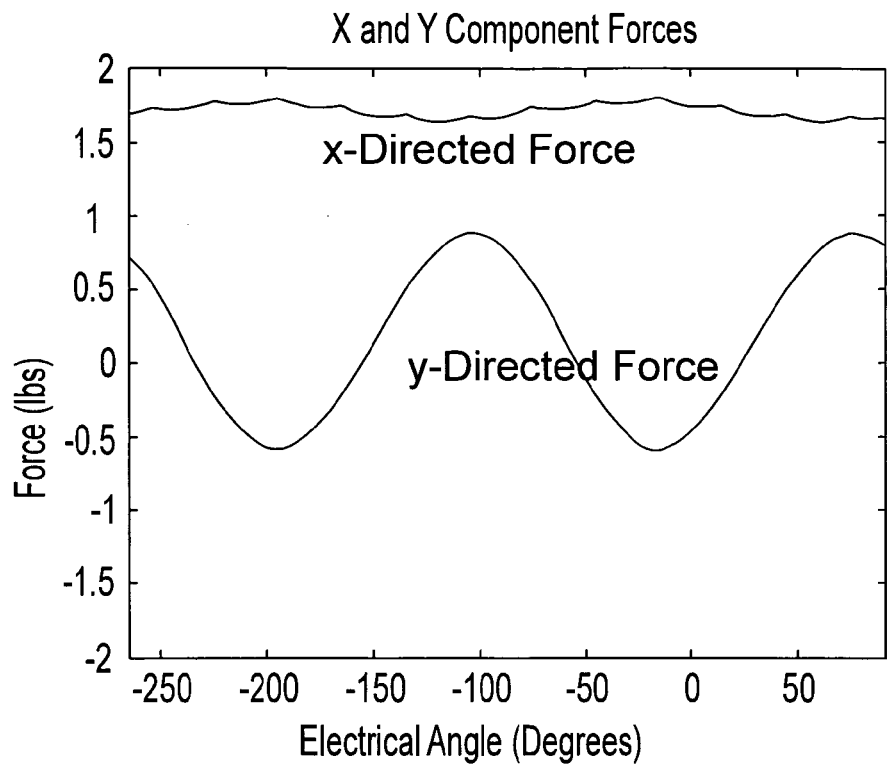
FIG. 7 is a graphic representation of force components.

Note that while the d-axis current produces no torque, it does produce a lateral force. It should be noted what happens if the rotor reference frame d-axis currents are permitted to be different in the three different three-phase pole pairs 24, while keeping the rotor reference frame q-axis currents the same. FIG. 5 shows the force produced on the rotor 30 when 10 amps (first positive, then negative) is applied individually to each of the pole pairs 24 of the rotor reference frame d-axes while the other pole pairs have zero rotor reference frame d-axis and q-axis currents. FIG. 6 shows the magnitude of the force on the rotor 30 with $i_{ds1}^r = +10$ A, and the rest of the rotor reference frame d-axis and q-axis currents set to zero. This force has an average value of 1.8 lbs. This force has a strong fourth harmonic ripple, and also a much smaller second harmonic component. The rotor force components in the x and y directions, which are plotted in FIG. 7, each have second harmonic ripples, and combine to generate the fourth harmonic ripple in the force.

Figure 8:
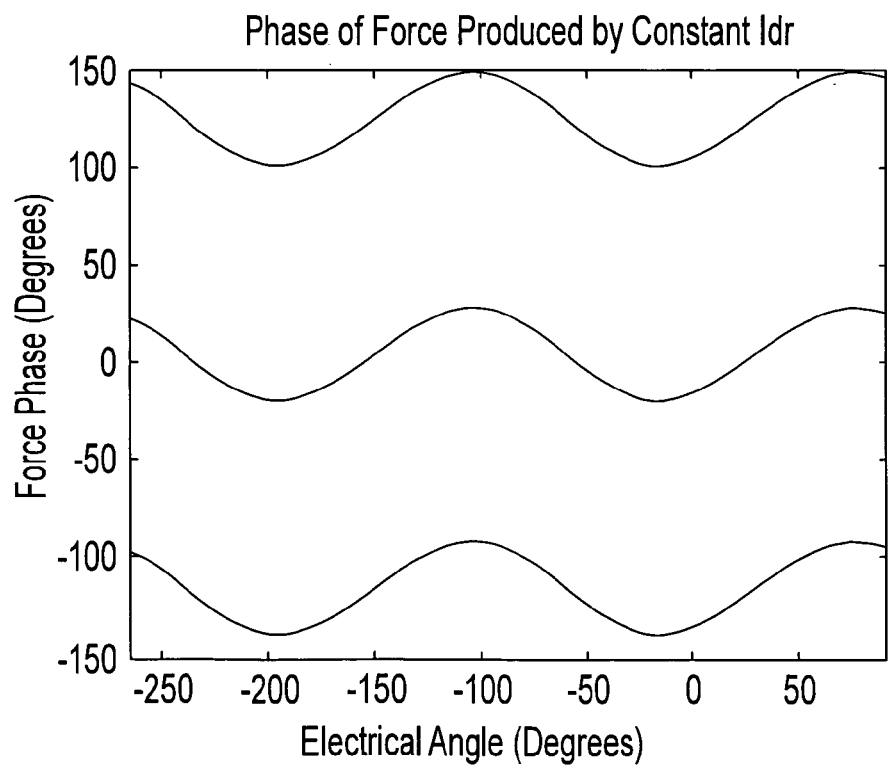
FIG. 8 is a graphic representation of phases of induced force by different pole pairs.

The above results demonstrate that the forces generated by the rotor reference frame d-axis current $i_{ds}^r$ have fairly constant magnitudes. The force phases generated on the rotor using constant d-axis currents are plotted in FIG. 8. Note that this Fig. plots the phases of the force in mechanical degrees versus the electrical angle of the motor. The phases of the rotor forces generated by exciting separate rotational reference frame d-axis currents are 120 mechanical degrees apart from each other, and vary 46 mechanical degrees (+/−23 mechanical degrees) over an electrical revolution.

Figure 9:
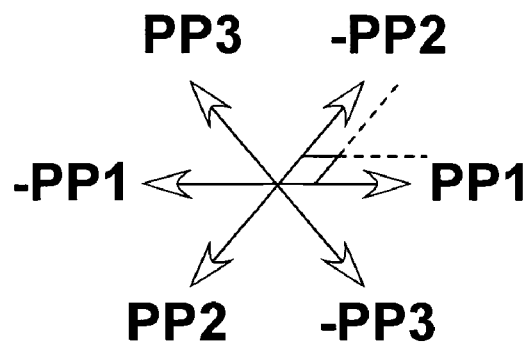
FIG. 9 is a diagrammatic representation of force vectors.

FIG. 9 shows the force vectors PP1, −PP1, PP2, −PP2, PP3, −PP3 that are possible with the different pole pairs 24. There are six possible force directions, using the positive and negative rotational reference frame d-axis currents. These forces bound six distinct regions. A desired force within any region can be produced optimally by using the vectors bordering that region as the basis. From this, a control system can be developed.

First, the phases of the six force vectors PP1, −PP1, PP2, −PP2, PP3, −PP3 need to be determined. By fitting the results in FIG. 8, the force phase β is calculated for each of the six force vectors PP1, −PP1, PP2, −PP2, PP3, −PP3 as a function of electrical angle of the rotor $\theta_r$:

$$\beta_1 = 4.3050 + 23.155 \cdot \cos\left(2 \cdot (\theta_r + 105)\frac{\pi}{180}\right) \quad (2)$$

$$\beta_{1\text{-}negative} = \beta_1 + 180 \quad (3)$$

$$\beta_2 = \beta_1 - 120 \quad (4)$$

$$\beta_{2\text{-}negative} = \beta_2 + 180 \quad (5)$$

$$\beta_3 = \beta_1 + 120 \quad (6)$$

$$\beta_{3\text{-}negative} = \beta_3 + 180 \quad (7)$$

During rotor levitation, the phase of the desired force is calculated and compared with the six available force vectors PP1, −PP1, PP2, −PP2, PP3, −PP3, and the two force vectors that border the region containing the desired force are then chosen as the basis. Next, the desired force is transformed from the x, y basis to the basis containing the phase of the two vectors to be used, $\beta_{boundary\text{-}1}$, and $\beta_{boundary\text{-}2}$. The transformation is performed using the following matrix:

$$P = \begin{bmatrix} \text{real}\left(e^{j\beta_{boundary\text{-}1} \cdot \frac{180}{\pi}}\right) & \text{real}\left(e^{j\beta_{boundary\text{-}2} \cdot \frac{180}{\pi}}\right) \\ \text{imag}\left(e^{j\beta_{boundary\text{-}1} \cdot \frac{180}{\pi}}\right) & \text{imag}\left(e^{j\beta_{boundary\text{-}1} \cdot \frac{180}{\pi}}\right) \end{bmatrix} \quad (8)$$

Figure 10:
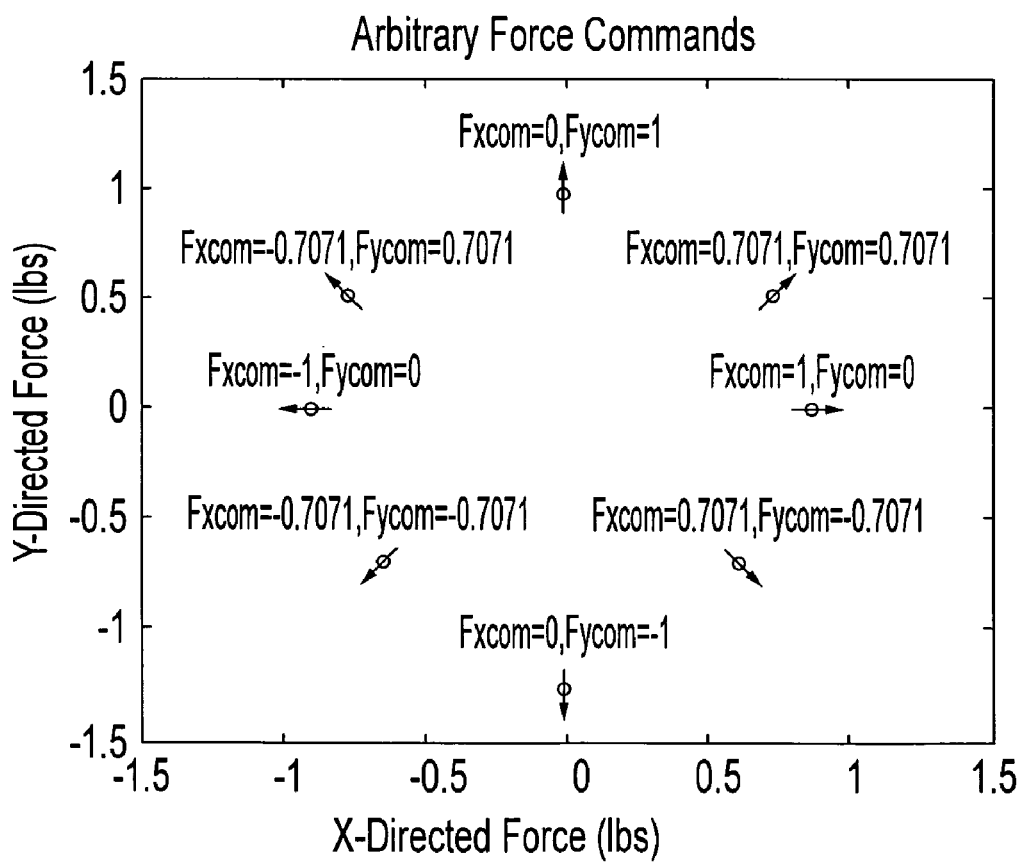
FIG. 10 is a graphic representation of force commands.

This allows the two currents that make up the boundary to the region, $i_{ds\text{-}boundary1}^r$, $i_{ds\text{-}boundary2}^r$, to be defined as follows.

$$\begin{bmatrix} i^r_{ds\text{-}boundary1} \\ i^r_{ds\text{-}boundary2} \end{bmatrix} = P^{-1} \cdot \begin{bmatrix} \dfrac{F_{x\text{-}com}}{currrentstiffness} \\ \dfrac{F_{y\text{-}com}}{currrentstiffness} \end{bmatrix} \quad (9)$$

where $F_{x\text{-}com}$ and $F_{y\text{-}com}$ are magnetic force bearing commands and current stiffness is a constant that determines the amount of force delivered to the rotor for 1 amp of current, in this case it is 0.18 lbs/A (per FIG. 6). This technique is used to generate various force commands; the results can be seen in FIG. 10. It should be noted that there may be some ripple in the force. This may be expected, as no attempt is made to reduce the natural ripple inherent to constant d-axis rotor reference frame current.

Now, a mechanical model of the rotor 30 is generated, with motor torques and forces as inputs, and the rotor angle, speed, lateral position and lateral velocity as outputs. This motor rotor is a mass which is free to move in the x and y directions, and begin by defining the following complex quantities:

$$x_1 = Pos_x + i \cdot Pos_y$$

$$x_2 = Vel_x + i \cdot Vel_y$$

where $x_1$ and $x_2$ are system states defining rotor lateral position and velocity, i is imaginary number, $Pos_x$ and $Pos_y$ are x and y rotor positions in inches, and $Vel_x$ and $Vel_y$ are x and y rotor positions in meters per second.

From Newton's second law:

$$F = ma = m \dot{x}_2$$

where F is force in Newtons, m is mass in kilograms.

With this information, the system can be described as follows:

$$\begin{bmatrix} \dot{x}_1 \\ \dot{x}_2 \end{bmatrix} = \begin{bmatrix} 0 & 1 \\ 0 & 0 \end{bmatrix} \begin{bmatrix} x_1 \\ x_2 \end{bmatrix} + \begin{bmatrix} 0 \\ \dfrac{1}{m} \end{bmatrix} F = A \begin{bmatrix} x_1 \\ x_2 \end{bmatrix} + BF \quad (10)$$

where A and B are linear state space description matrices.

Note that the controllability matrix C of this system is:

$$C = [B \ A \cdot B] = \begin{bmatrix} 0 & \dfrac{1}{m} \\ \dfrac{1}{m} & 0 \end{bmatrix} \quad (11)$$

This matrix has full rank so the system is controllable. Now, angular quantities are defined as follows:

$$x_3 = \theta_{mechanical}$$

$$x_4 = \omega_{mechanical}$$

where $x_3$ and $X_4$ are angular position and velocity, $\theta_{mechanical}$ is the mechanical angle of the rotor in radians, and $\omega_{mechanical}$ is mechanical speed in radians per second.

With these quantities, the angular system can be described as:

$$\begin{bmatrix} \dot{x}_3 \\ \dot{x}_4 \end{bmatrix} = \begin{bmatrix} 0 & 1 \\ 0 & 0 \end{bmatrix} \begin{bmatrix} x_3 \\ x_4 \end{bmatrix} + \begin{bmatrix} 0 \\ \dfrac{1}{J} \end{bmatrix} T \quad (12)$$

where J is rotational inertia and T is torque in newton-meters.

The controllability matrix C of this system is:

$$C = [B \ A \cdot B] = \begin{bmatrix} 0 & \dfrac{1}{J} \\ \dfrac{1}{J} & 0 \end{bmatrix} \quad (13)$$

The controllability matrix is again full rank, thus the system is controllable.

Now the position of the rotor can be described using the differential equations above along with the calculated torques and forces.

As was mentioned previously, motor torque will be controlled by enforcing the same appropriate rotor reference frame q-axis currents $i_{qs}^r$ on all three pole pair systems. Also, it has been demonstrated that any desired radial force can be obtained by correctly controlling the rotational reference frame d-axis currents in the individual pole pairs 24. Using the results above, a rudimentary magnetic bearing controller can be designed to levitate the rotor 30; the position will be controlled with a proportional derivative (PD) controller (not shown). The controller has negative stiffness compensation, which essentially cancels the negative stiffness due to the motor permanent magnets (PMs). This controller outputs a force command, which is broken down into three pole pair rotor reference frame d-axis currents $i_{ds1}^r$, $i_{ds2}^r$, $i_{ds3}^r$. The motor may have mechanical touchdown bearings (not shown) which prevent the rotor 30 from contacting the lamination stacks of the stator 32 (see FIG. 4); they limit rotor motion to within 10 mils of center. On startup, the rotor 30 will be resting on these bearings, thus, the rotor will be levitated from the starting point on the touchdown bearing. Obviously these dimensions are dependent on the physical characteristics of the motor.

Figure 11:
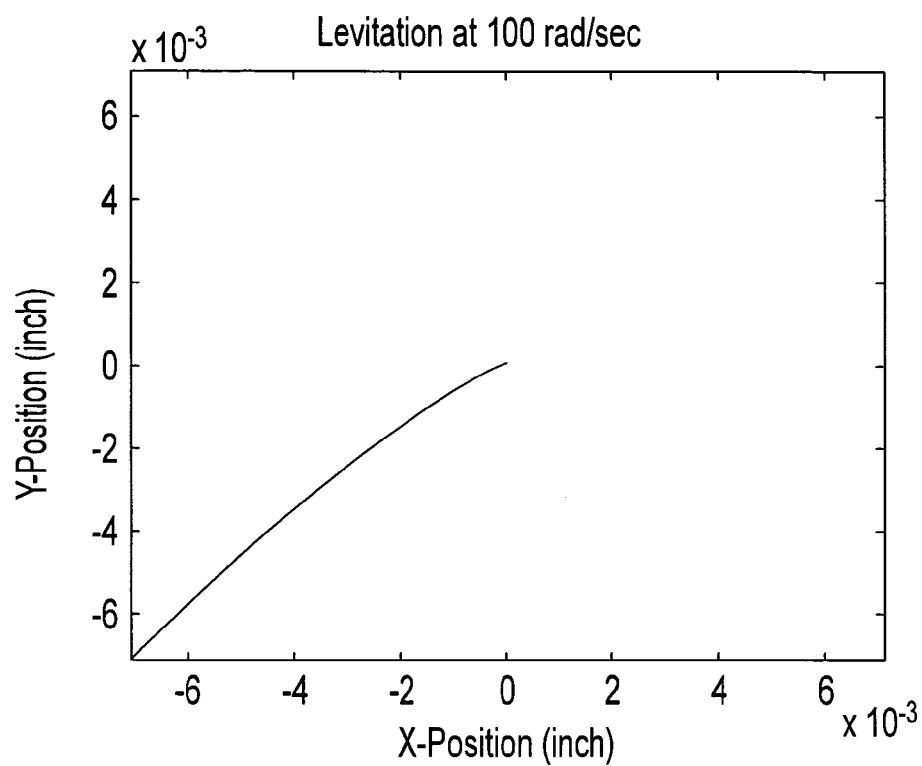
FIG. 11 is a graphic representation of rotor levitation.
Figure 12:
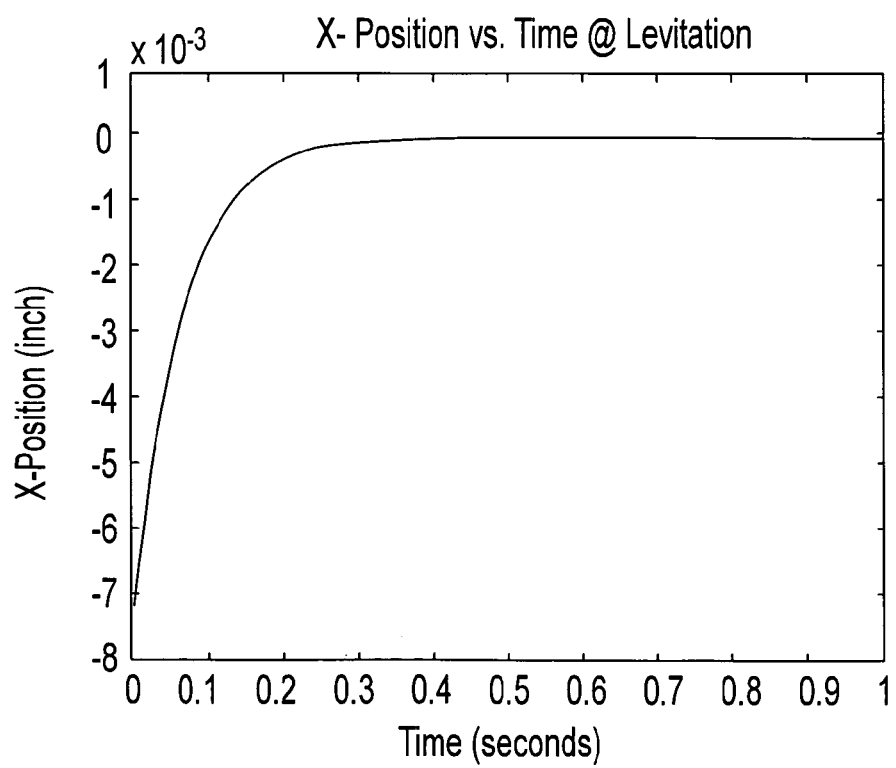
FIG. 12 is a graphic representation of x-position during levitation.
Figure 13:
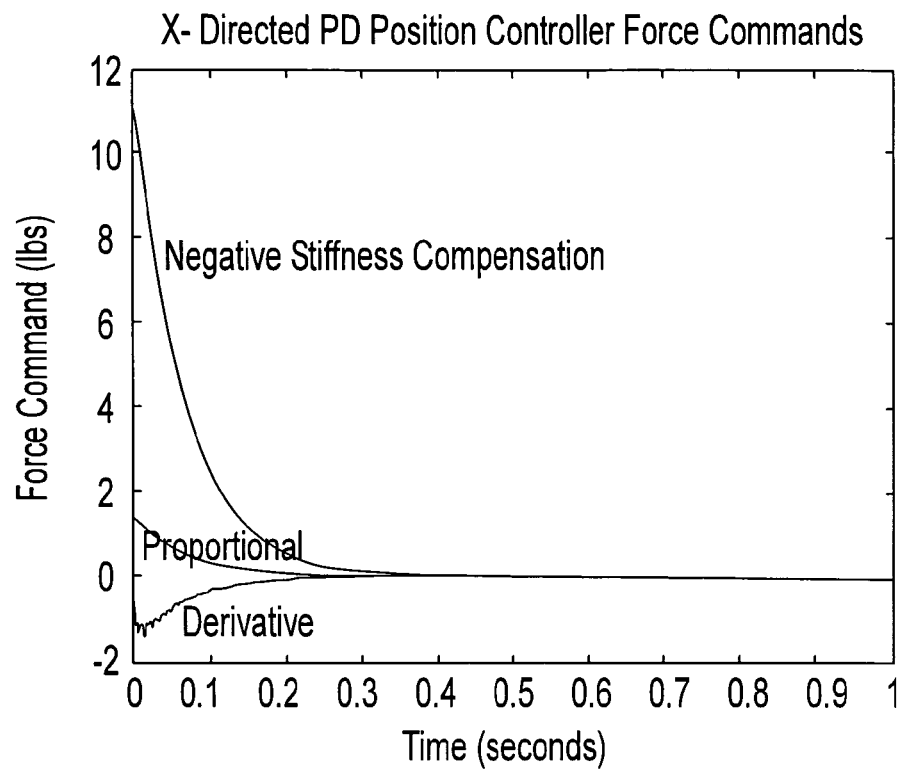
FIG. 13 is a graphic representation of force command components.
Figure 14:
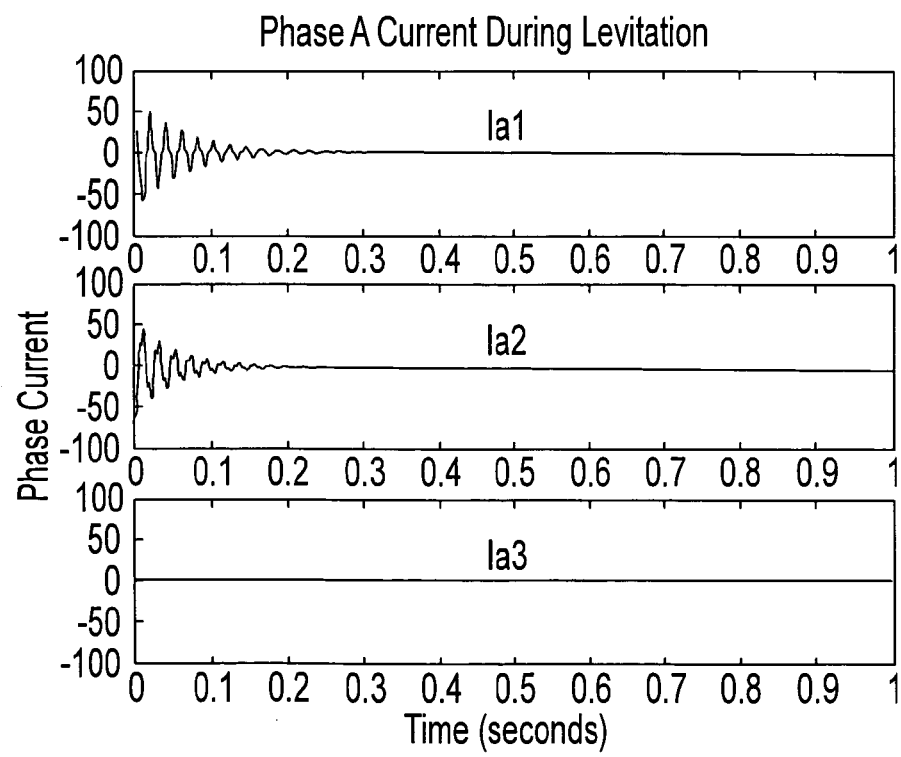
FIG. 14 is a graphic representation of phase currents in three different pole pairs during a levitation period with a 10 A rotor reference frame q-axis current.

When the controller is implemented, the rotor 30 is levitated off of the touchdown bearing with an initial speed, such as 100 radians per second, and a torque command, which in this example is zero (thus $i_{qs}^r = 0$ for all three systems). FIG. 11 shows the x, y plot of the rotor during this levitation, and FIG. 12 shows the x-component of position versus time during the levitation. FIG. 13 shows the PD force command separated into the negative stiffness compensation, proportional gain, and derivative components. The phase currents during this levitation period are seen in FIG. 14. The currents can be fairly high when the rotor 30 is being pulled off the back up bearings but the currents should decrease dramatically as time increases, and the rotor approaches the center. Rotor imbalance and sensor noise are present in the system, and some amount of current will be required to hold the rotor 30 in the center of the touchdown bearing. The rotor 30 may be intentionally rotated around its center of mass instead of its geometric center, which minimizes levitation currents, although in this case the position will not necessarily be forced to center.

Figure 15:
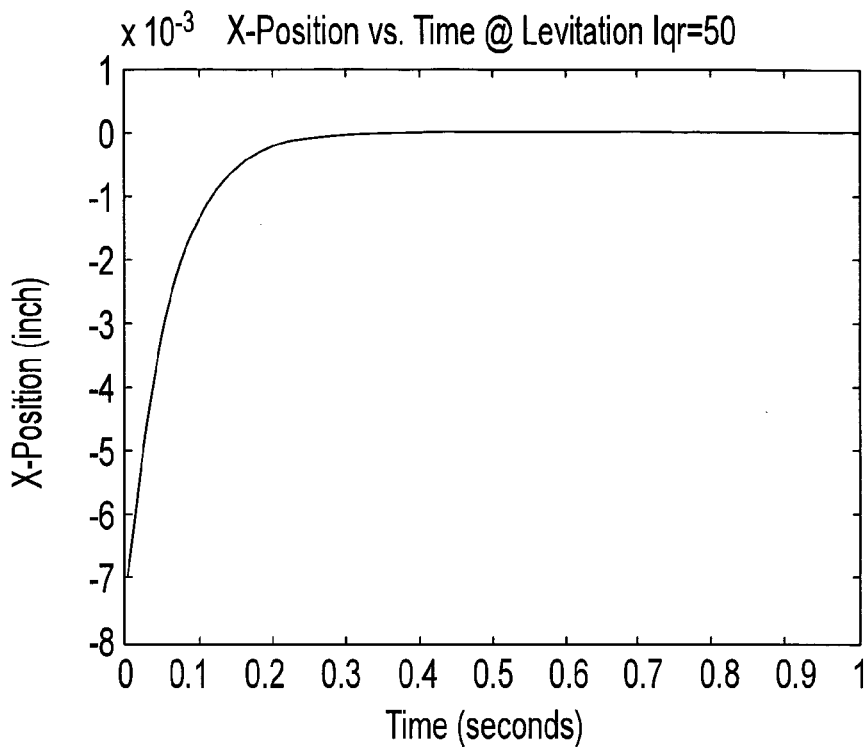
FIG. 15 is a graphic representation of levitation off a back-up bearing.

In order to show that this control system provides simultaneous motor and magnetic bearing action, levitation is repeated, this time with 50 A of rotor reference frame q-axis current. The x position during this levitation is plotted in FIG. 15. This figure shows that the time response of levitation does not appreciably change with motoring current.

Figure 16:
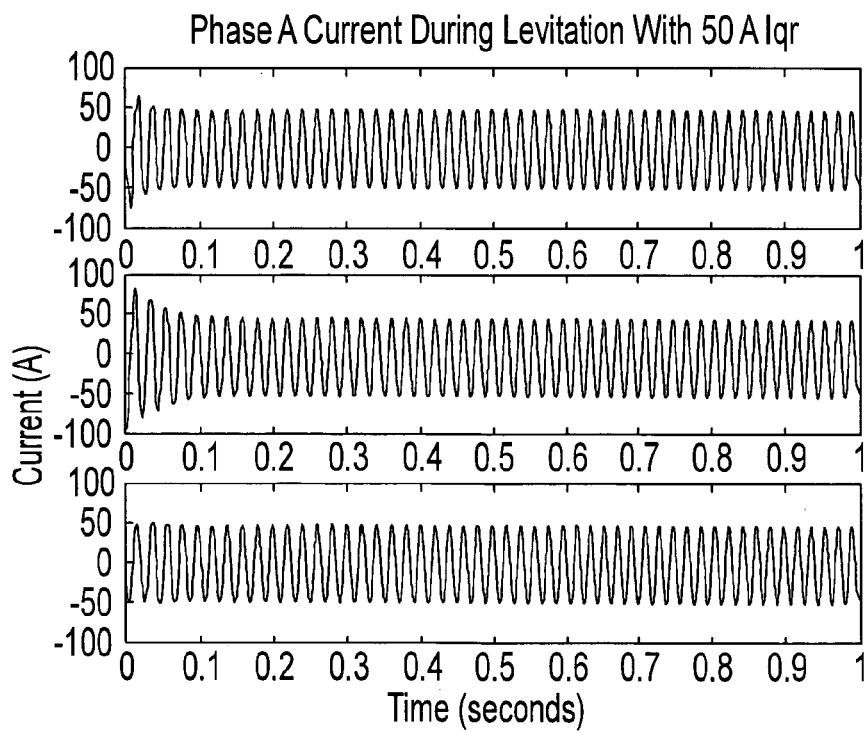
FIG. 16 is a graphic representation of phase currents in three different pole pairs during a levitation period with a 50 A rotor reference frame q-axis current.

The phase currents present while levitating with 50 A $I_{qs}^r$ are shown in FIG. 16. The peak current of 95 A is achieved briefly during levitation in $I_{a2}$. The maximum current reached during the levitation period with no $I_{qs}^r$ is 61 A, also in $I_{a2}$. So, it is apparent that for a particular force level, the motor should be de-rated from its maximum power level. However, in this example, the magnetic bearing function needs a large force only during levitation, to overcome the negative stiffness while lifting the rotor 30 off of the back-up bearing. If this is the only time a large amount of current is required, temporarily exceeding the maximum phase limit of the motor will not be a problem, since the excess current will be present for such a brief period that no appreciable wire heating will occur. Actually, during most applications, levitation will occur before motoring starts, so the added current requirement may not exist at all.

The relevant factor to be considered when selecting ratings is the force needed to levitate the rotor. This involves factors that are not considered, including sensor noise, shaft runout, and rotor imbalance. In addition to compensating for these factors, if the motor is used as a flywheel in a satellite, it may be necessary to levitate the rotor on earth before sending it to orbit, which would require that the bearing system be able to support the weight of the rotor 30. Furthermore, the motor may be used to provide attitude control of the satellite in addition to energy storage. In this application, the magnetic bearing should be able to keep the rotor 30 levitated while the spacecraft is rotated.

Figure 17:
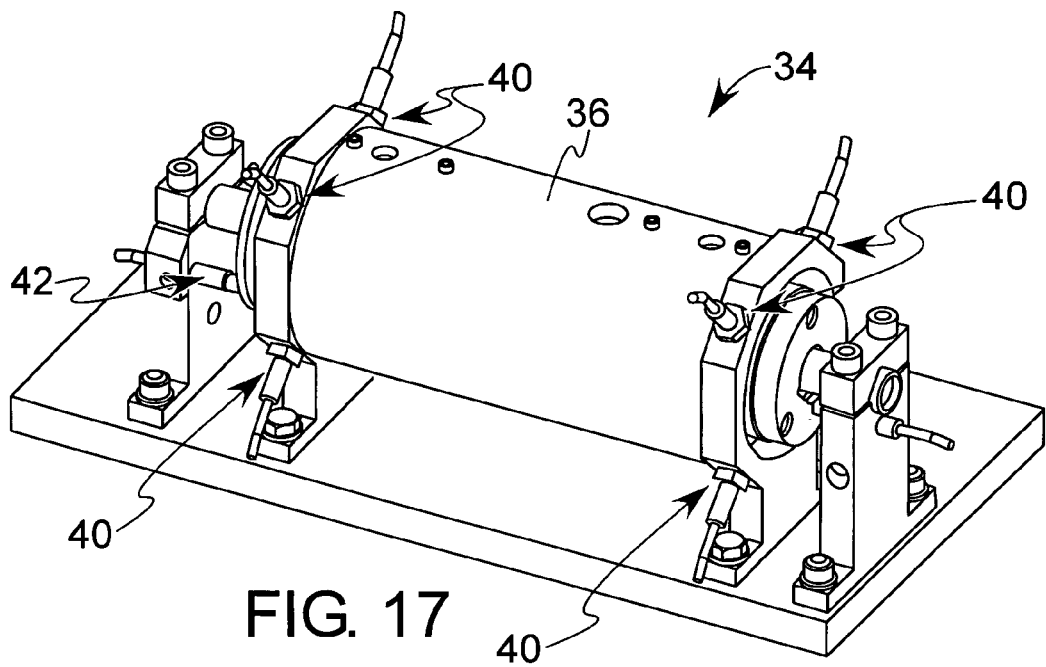
FIG. 17 is a perspective view of a conical motor driven by conical motor drive control system according to one embodiment of the invention.
Figure 18:
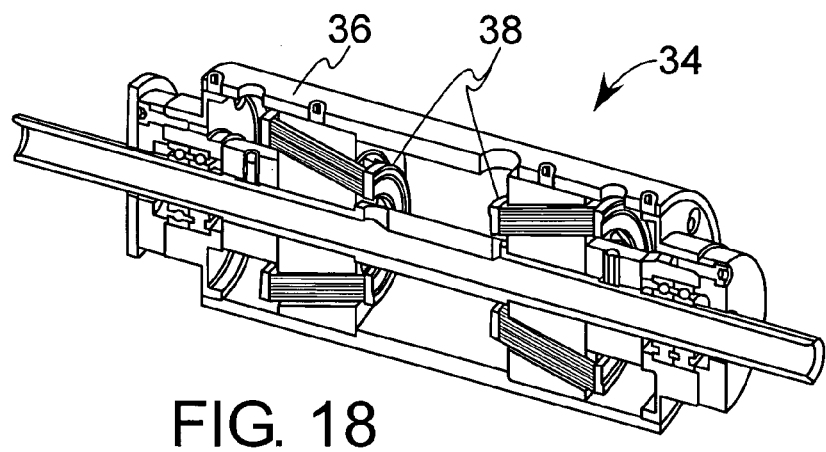
FIG. 18 is a sectional perspective view of the conical motor shown in FIG. 17.
Figure 19:
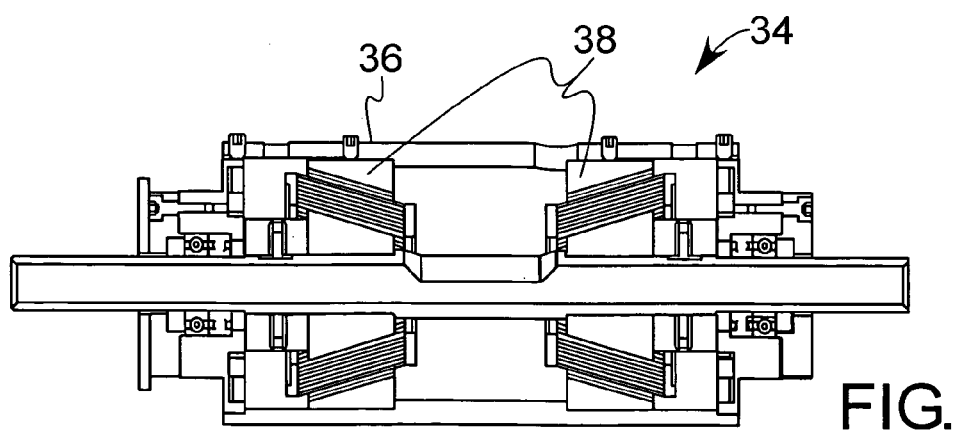
FIG. 19 is a sectional elevation view of the conical motor shown in FIG. 17.

Two conical motors, wound with three separated pole pairs, can be used together with the aforementioned control system to fully levitate and spin a rotor. An example of a machine 34 having two such conical motors is shown in FIGS. 17-19. In the illustrated embodiment of the machine 34, a rotor 36 rotates on the outside of stators 38, although a machine may be configured with rotors that rotate on the inside of the stators. Information on the position of the rotor 36 is received by a controller with eight radial eddy current sensors 40 and four axial eddy current sensors 42.

Figure 20:
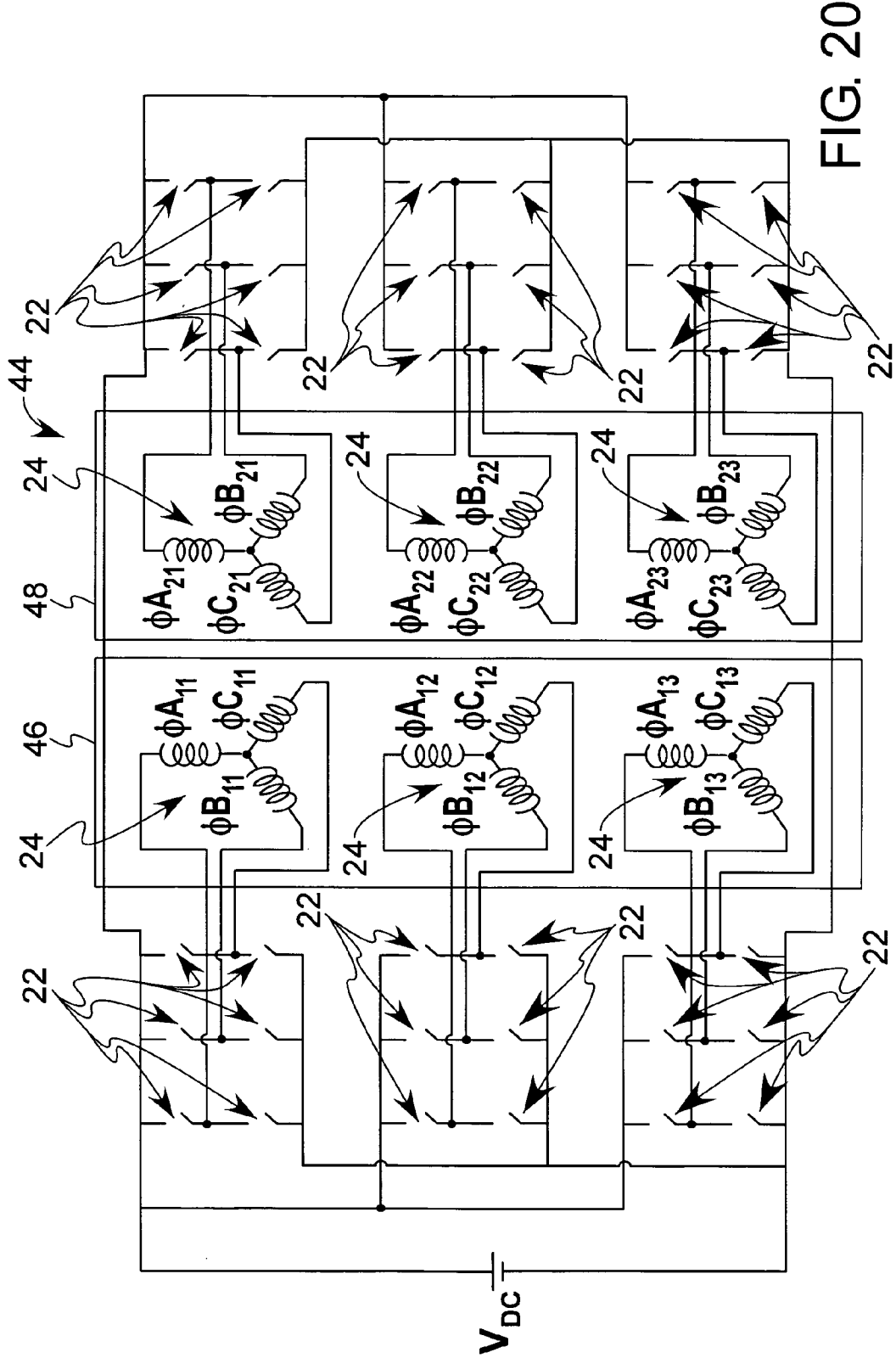
FIG. 20 is a schematic representation of a conical motor drive control system according to one embodiment of the invention.

An exemplary control system 44 for driving the two conical motors is shown in FIG. 20. One conical motor comprises windings 46 comprised of three three-phase pole pair systems 24. The other conical motor comprises windings 48 also comprised of three three-phase pole systems 24. One advantage of this type of motor drive control system is that it provides fault tolerance; if any switch 22 or pole pair system 24 fails, the other two three-phase systems 24 will still provide rotation and levitation forces.

Figure 21:
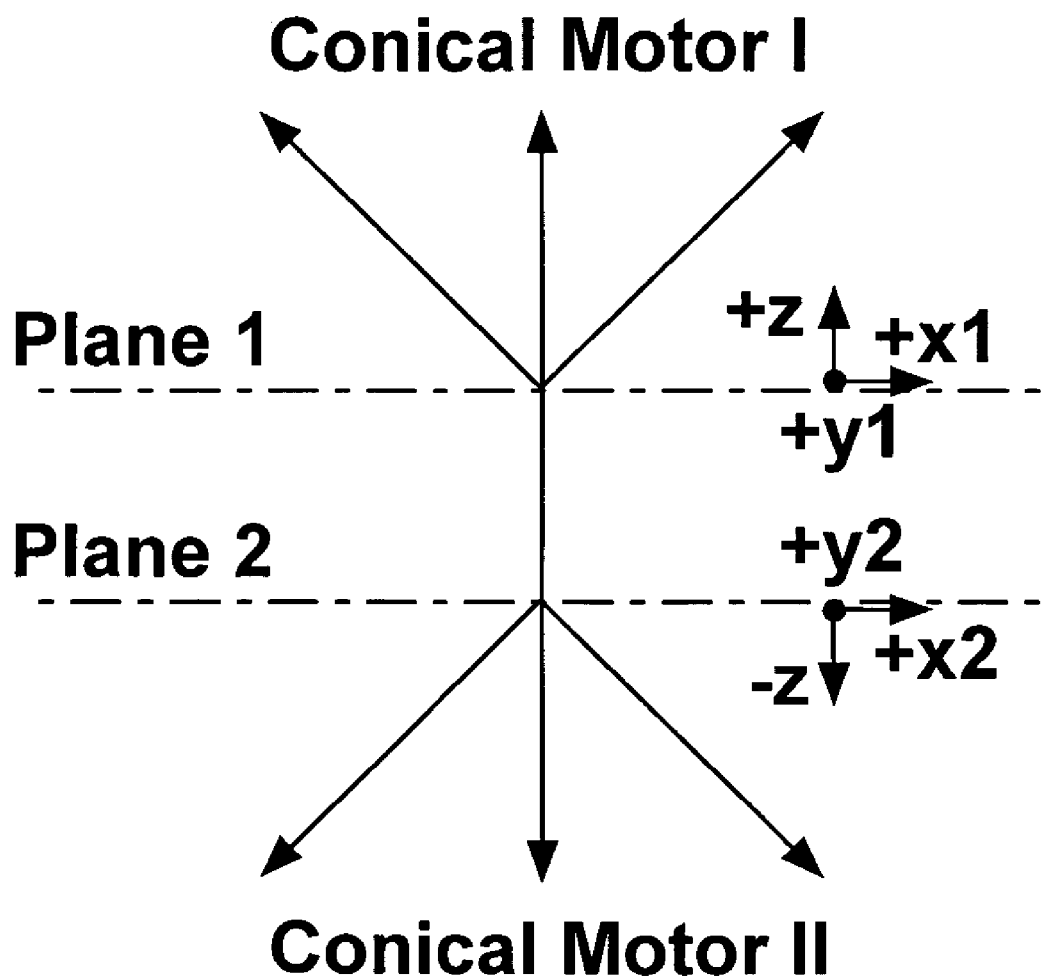
FIG. 21 is a diagrammatic representation of force vectors.

FIG. 21 shows the force vectors that are possible with the different pole pair systems 24. There are six force vectors that have an axial component as well as a radial component.

Figures 22, 22A:
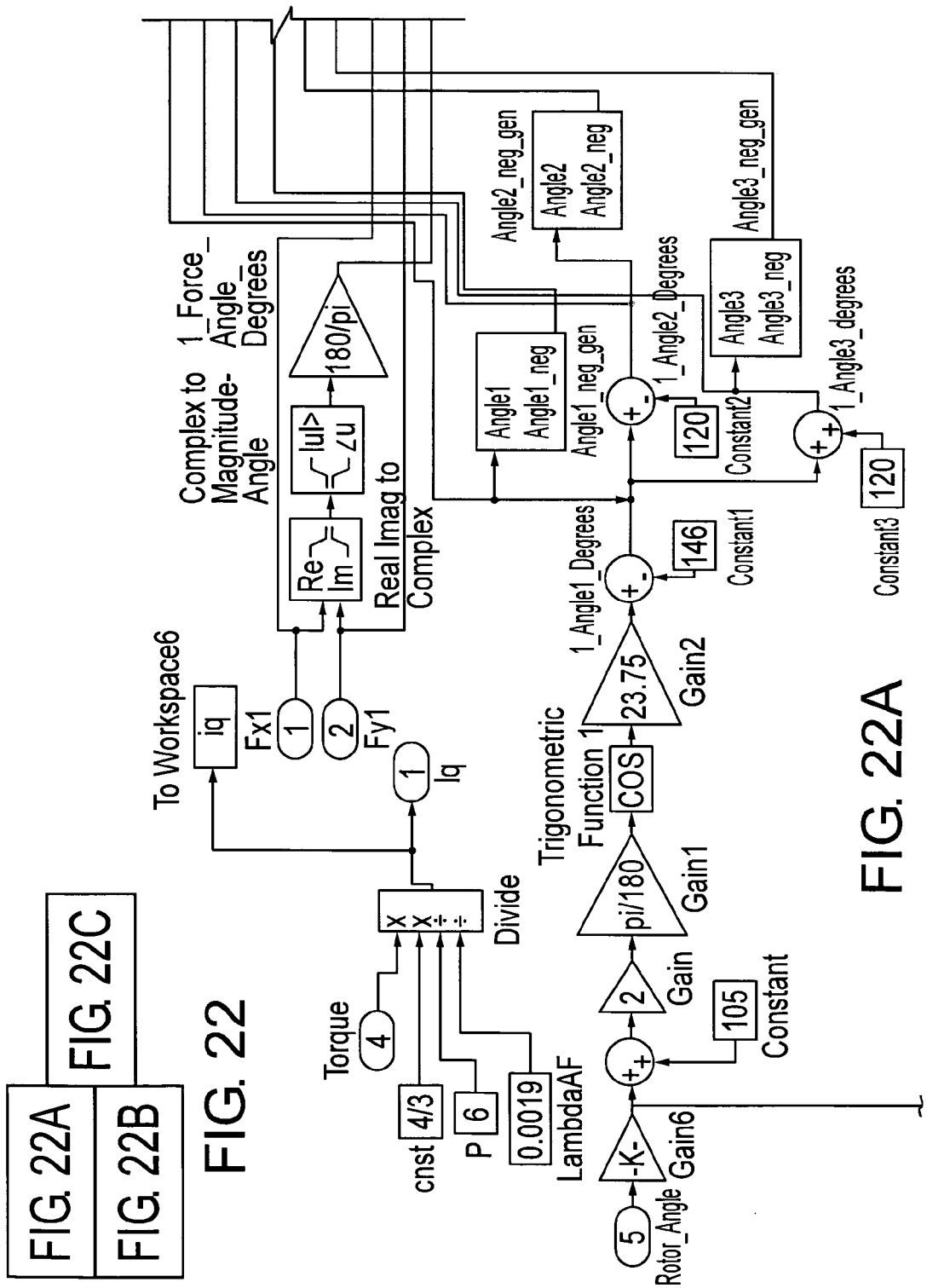
FIG. 22 is a schematic representation of a force generation control code.
Figure 22B:
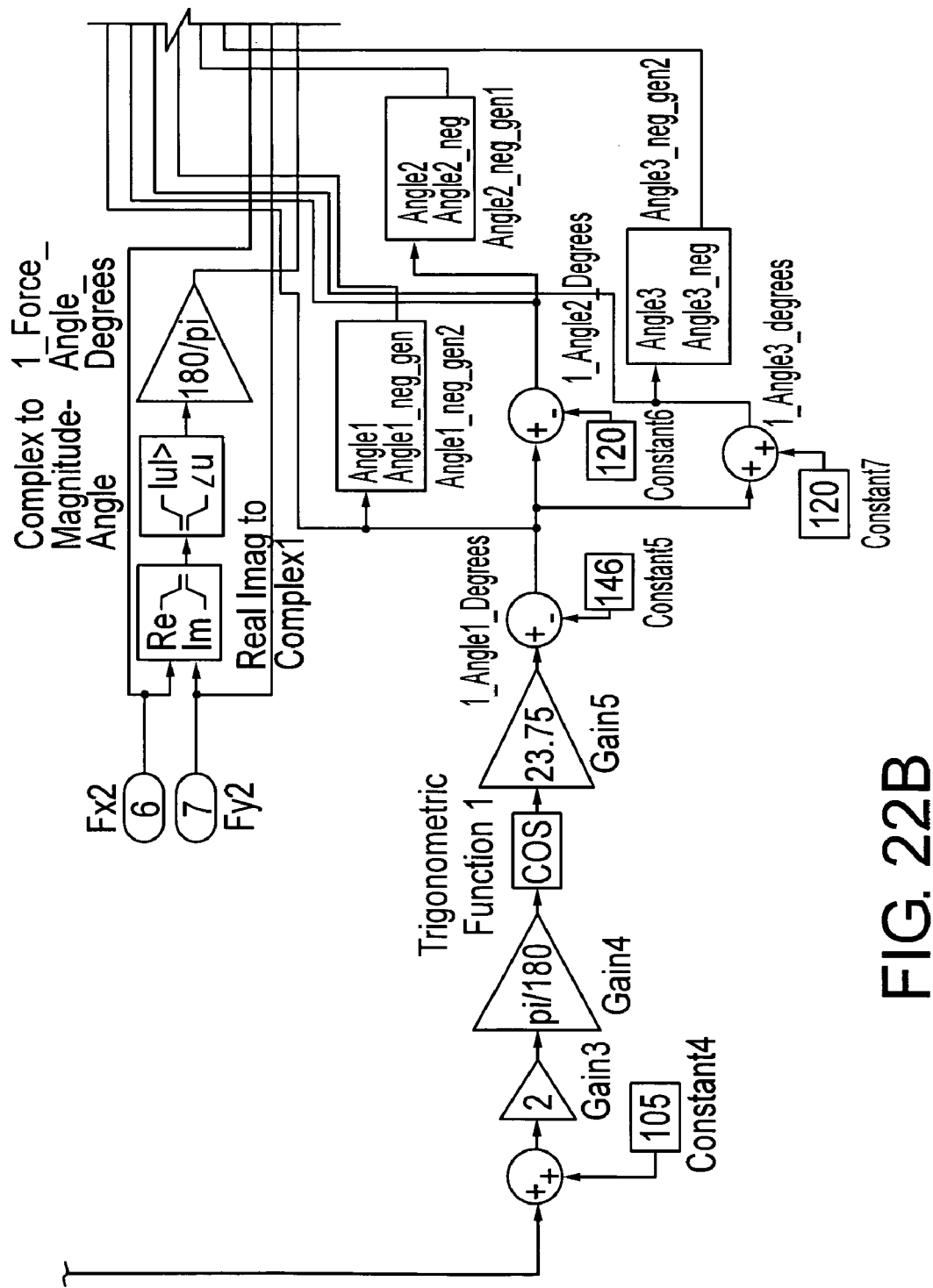
Figure 22C:
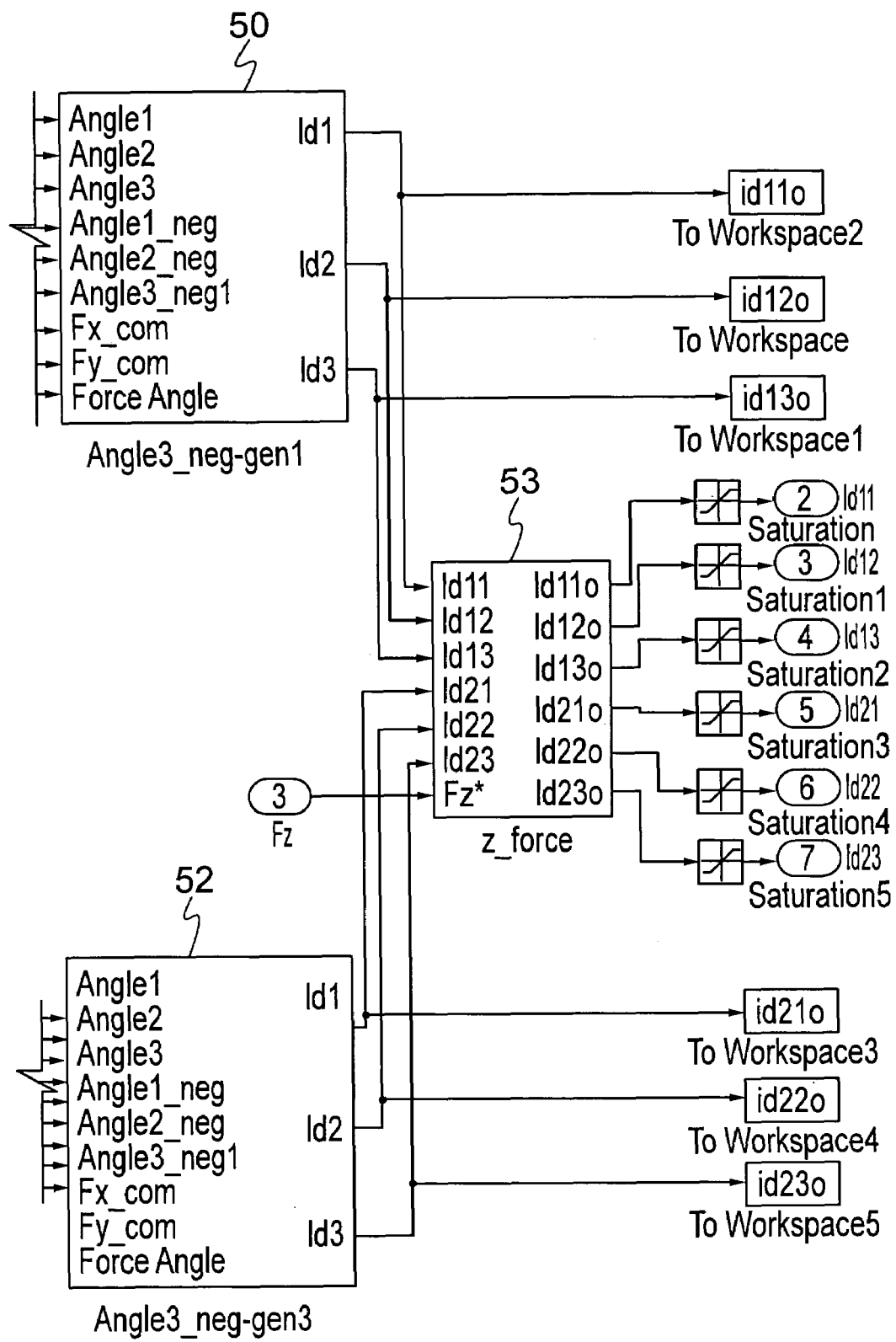
Figure 23:
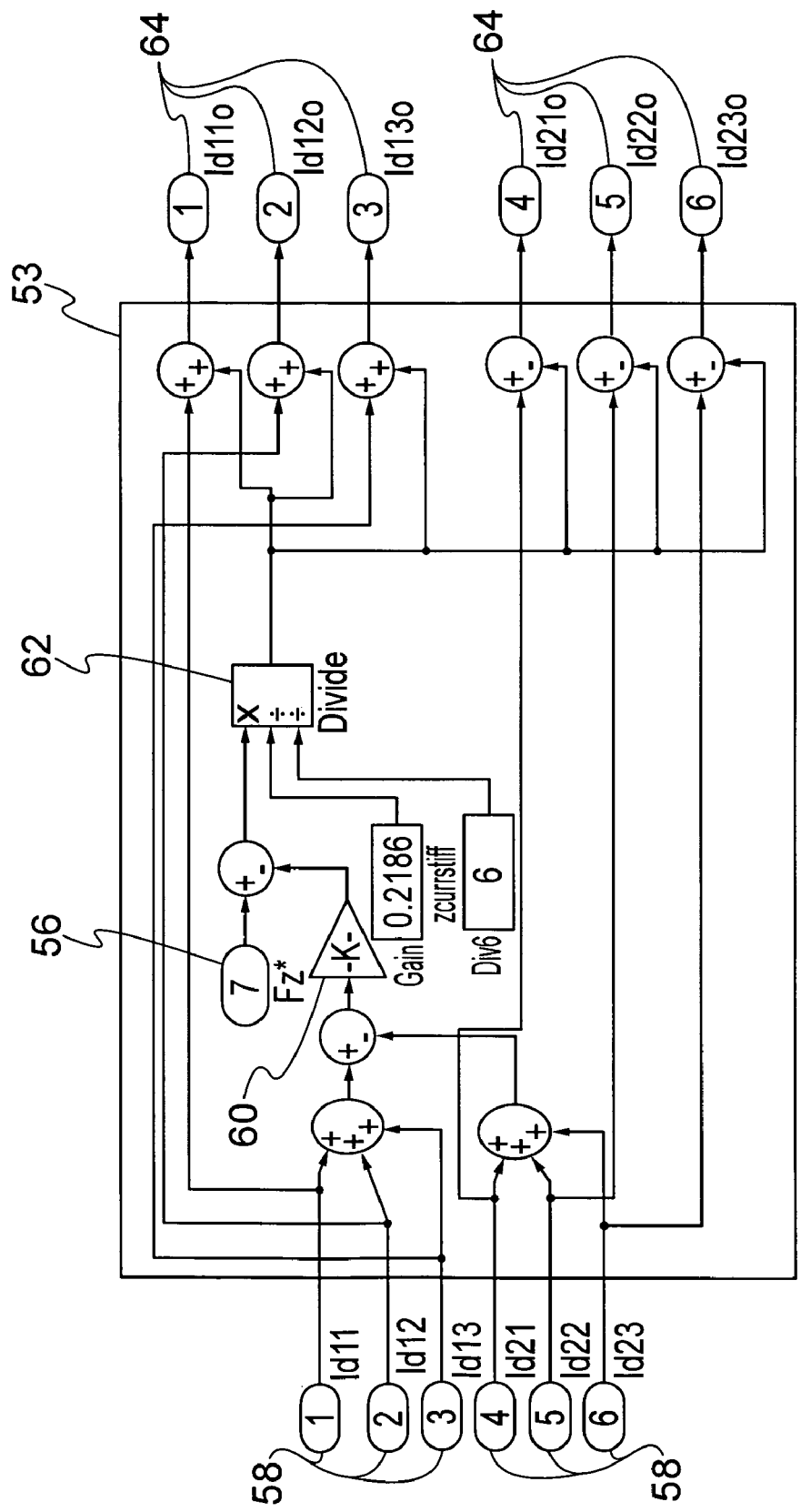
FIG. 23 is a schematic representation of an axial force control block.

FIG. 22 shows a schematic force generation control code. Radial force control blocks 50, 52 use a radial control technique, as discussed above in connection with the cylindrical motor control system. The conical motor essentially reduces the current stiffness, as compared to that required by a similarly sized cylindrical motor, since all of the magnitude of force is no longer directed radially. The radial force control block 50 controls the radial force applied to Plane 1, while the radial force control block 52 controls the force applied to Plane 2. A new control block 53 is introduced to control the axial force. FIG. 23 shows a schematic of this control block 53. The inputs to this control block 53 are the axial force command at 56 and the rotor reference frame d-axis current commands, which were generated with the radial force control blocks 50 and 52, at 58. Axial force is created when the total force acting on Plane 1 is different than the total force acting on Plane 2. Thus, if one plane is creating a large radial force, it will have the effect of creating some axial force. However, the resultant axial force can be compensated for by adding equal parts of d-axis current to all of the pole pair systems 24 on the other motor. The axial force created by the radial controllers is calculated by taking the sum of the rotor reference frame d-axis current commands from the radial controller at Plane 1 minus the sum of the rotor reference frame d-axis current commands from the radial controller at Plane 2, then multiplying by the current stiffness at 60. This calculated axial force is then simply subtracted from the commanded axial force. This value, calculated at 62, is added to the rotor reference frame d-axis current commands of Motor I (shown in FIG. 21) and subtracted from the rotor reference frame d-axis current commands of Motor II. The final rotor reference frame d-axis current commands at 64 are sent out of this axial force control block 54 to the standard rotor reference frame current regulators 66 in FIG. 24.

Figure 24A:
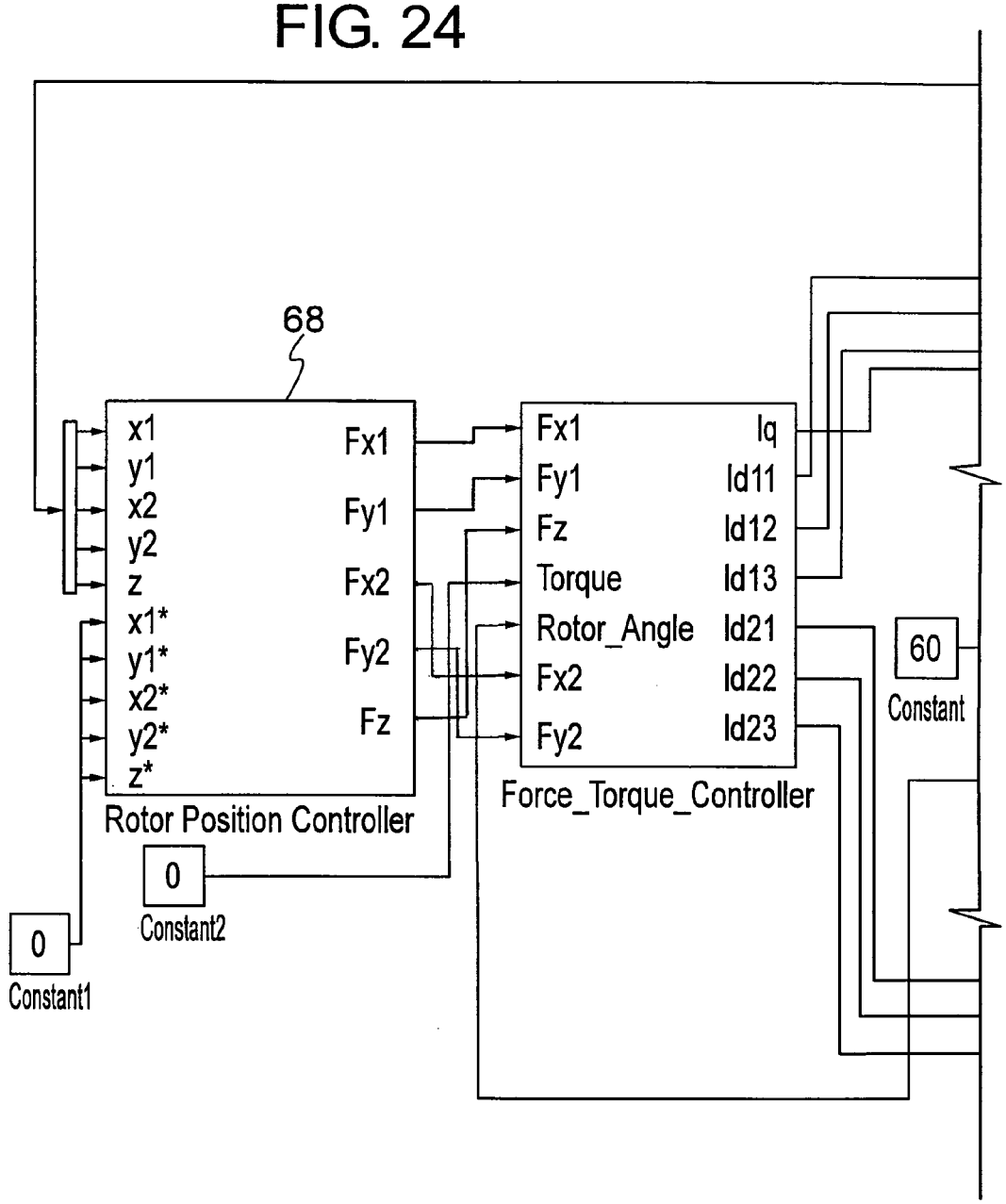
FIG. 24 is a schematic representation of a control circuit for the conical motor drive control system.
Figure 24B:
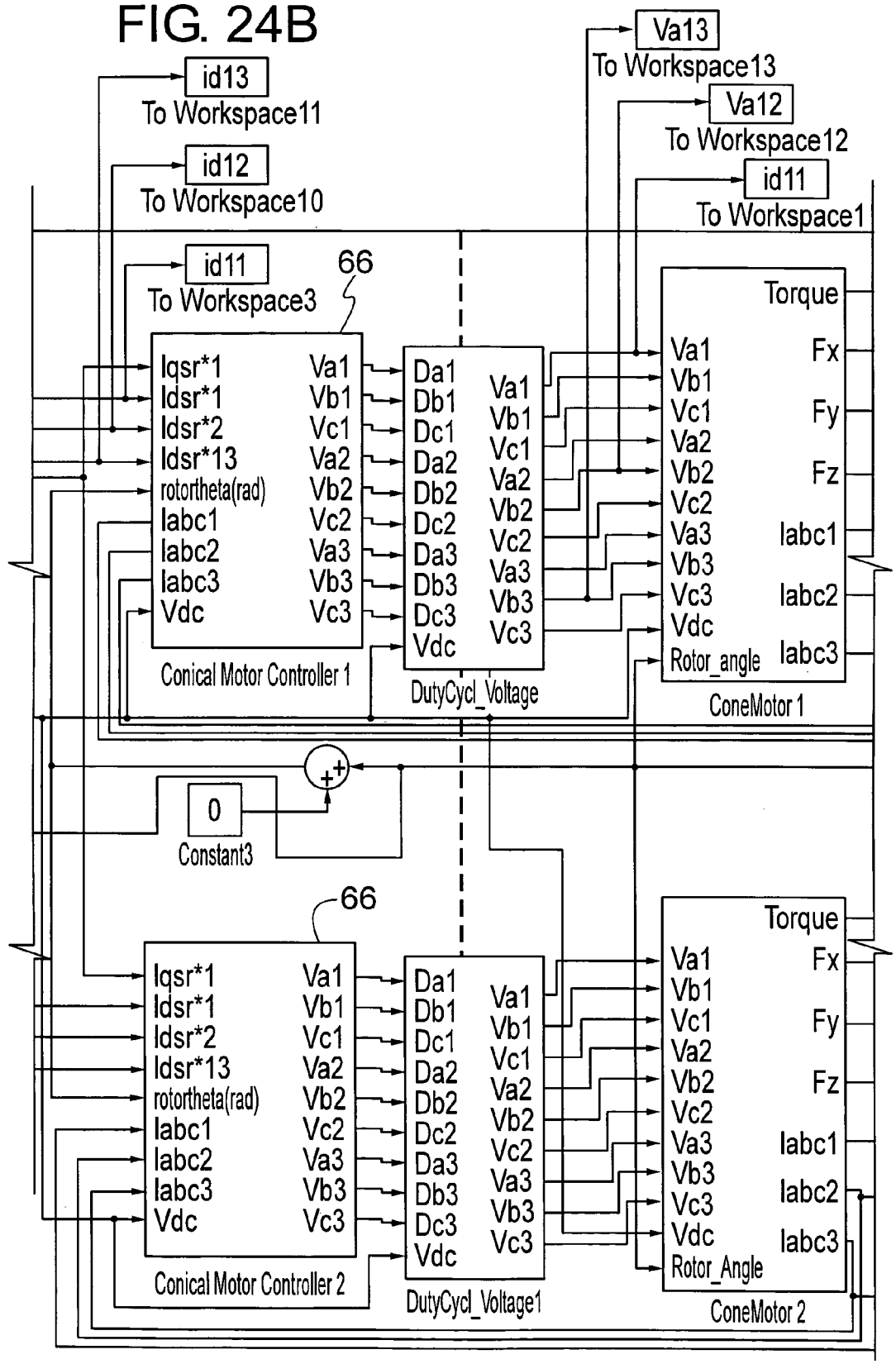
Figure 24C:
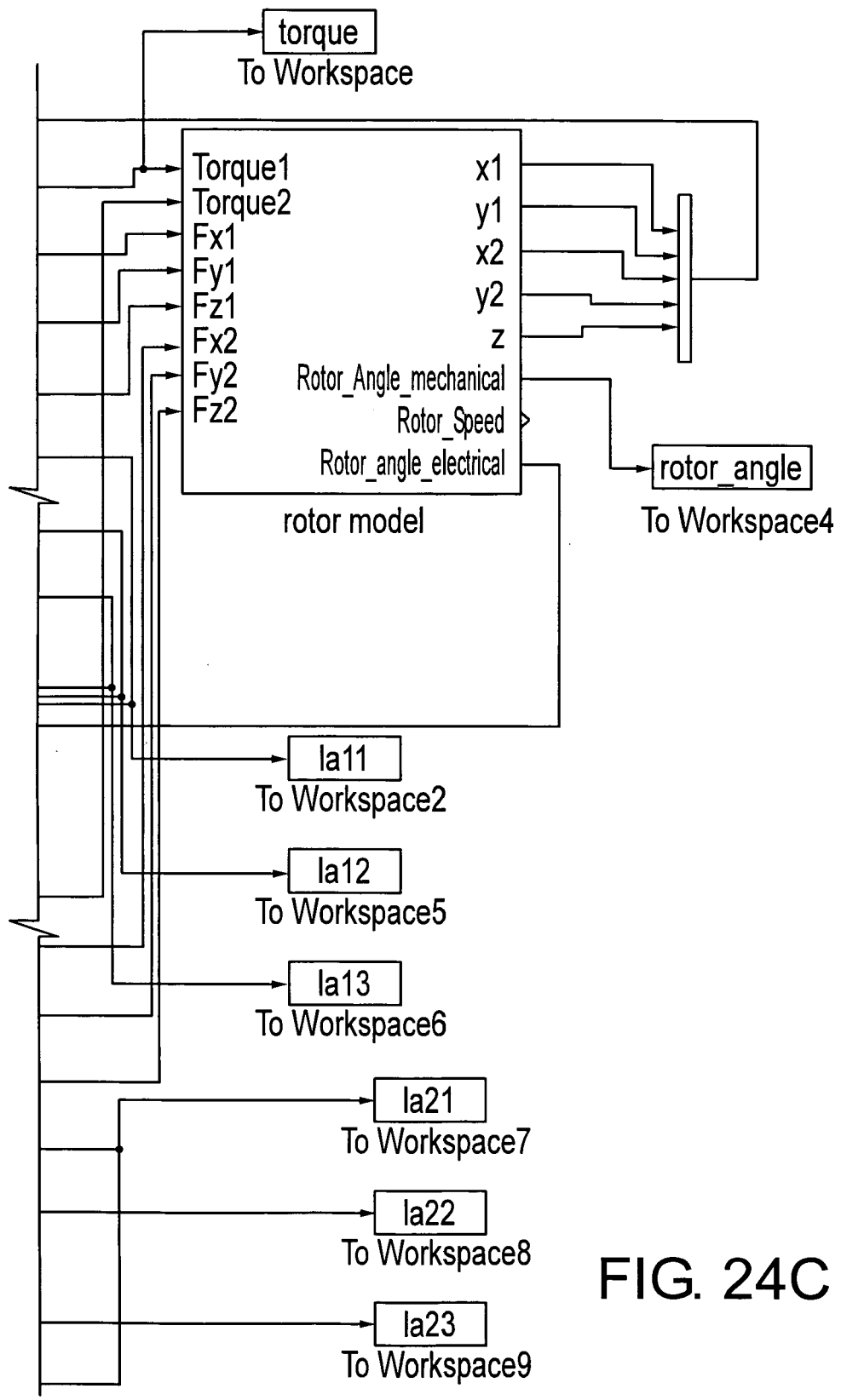
Figure 25:
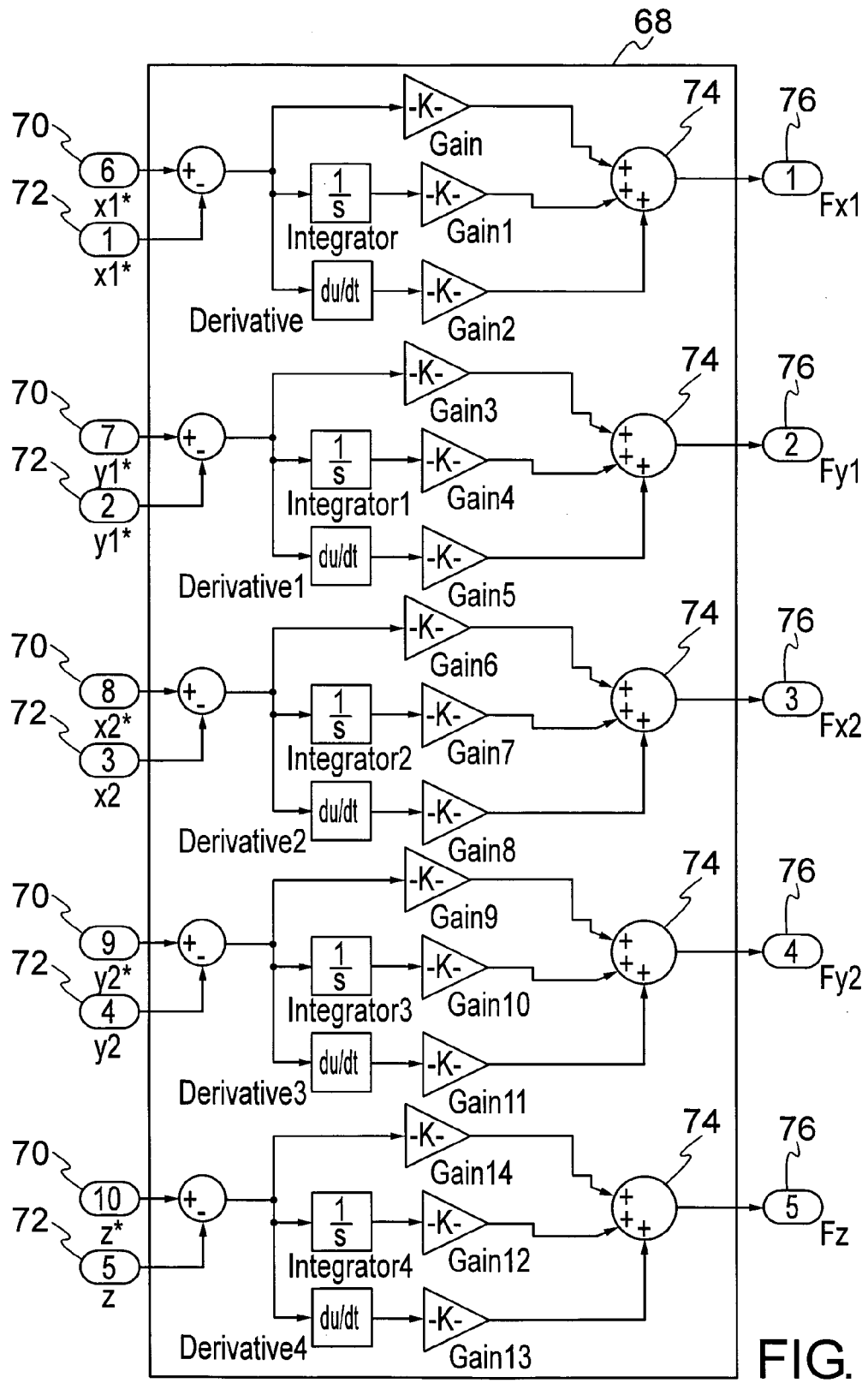
FIG. 25 is a schematic representation of an implementation of a position controller as a proportional-integral-derivative (PID) controller.

A position controller 68 in FIG. 24 receives position information from the sensors 40, 42 and outputs force commands necessary to maintain levitation. FIG. 25 shows one implementation of the position controller as a proportional-integral-derivative (PID) controller. Note that while this specific example uses a PID controller, any other suitable controller type can be used, as well. The commanded position is input at 70, while measured position is input at 72. A standard PID control loop is executed at 74. Force commands at 76 are the output of this block 68.

The present invention is not intended to be limited to the control system described above. Similarly, the present invention is not intended to be limited to any particular winding configuration. It should be appreciated that any suitable winding configuration may be used for carrying out the invention.

The aforementioned invention is not intended to be limited to the motor described above but can be used on other motors with six or more poles. Motors with which the invention can be used include, but are not limited to, induction motors, synchronous reluctance motors, and permanent magnet motors. The motors may be configured as cylindrical or conical, interior rotor/exterior stator, or exterior rotor/interior stator.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A control system for an electromagnetic rotary drive for use in the bearingless motor-generator having a permanent magnet, comprising:
    a winding configuration having at least three pole pair systems through which phase currents flow resulting in three three-phase systems, each three-phase system having a first rotor reference frame current that produces a levitating force with no average torque and a second rotor reference frame current that produces torque, wherein the first rotor reference frame current produces flux that increases or decreases permanent magnet flux of the motor-generator and the second rotor reference frame current is in phase with back EMF of the motor-generator.

2. The control system of claim 1, wherein the first rotor reference frame current of the three pole pair systems produce six force vectors in six force directions.

3. A bearingless motor-generator having a permanent magnet, comprising:
   a stator;
   a rotor supported for movement relative to the stator; and
   a control system having a winding configuration supported by the stator, the winding configuration comprising three or more pole pair systems through which phase currents flow resulting in three or more three-phase systems, each three-phase system having a first rotor reference frame current that produces a levitating force with no average torque and a second rotor reference frame current that produces torque,
   wherein the first rotor reference frame current produces flux that increases or decreases permanent magnet flux of the motor-generator and the second rotor reference frame axis current is in phase with back EMF of the motor-generator.

4. The bearingless motor-generator of claim 3, wherein the first rotor reference frame axis currents of the three or more pole pair systems produce six or more force vectors in six or more force directions.

* * * * *